United States Patent [19]

Haines et al.

[11] Patent Number: 4,504,345

[45] Date of Patent: Mar. 12, 1985

[54] TENNIS-BALLS

[75] Inventors: Robert C. Haines; Royce Pridgeon, both of Huddersfield, England

[73] Assignee: Dunlop Limited, London, England

[21] Appl. No.: 509,036

[22] Filed: Jun. 29, 1983

[30] Foreign Application Priority Data

Jul. 30, 1982 [GB] United Kingdom ............... 8222027
Jan. 18, 1983 [GB] United Kingdom ............... 8301264

[51] Int. Cl.³ .................... A63B 45/00; B32B 31/12
[52] U.S. Cl. .................................... 156/213; 156/230; 156/247; 156/280; 156/297; 156/241; 156/249; 156/304.1; 156/305; 156/310; 273/61 R
[58] Field of Search ............... 156/213, 230, 235–237, 156/247, 241, 280, 249, 155, 310, 289, 304.1, 305, 344, 297, 481, 497; 273/58 A, 58 B, 58 BA, 61 R, 61 B, 61 C, 65 E, 65 ED; 427/271, 272, 273, 282; 428/202, 200

[56] References Cited

U.S. PATENT DOCUMENTS

| | | | |
|---|---|---|---|
| Re. 29,303 | 7/1977 | Fraser, Jr. et al. | 273/61 R |
| 902,330 | 10/1908 | Rowley | 156/280 X |
| 1,593,211 | 7/1926 | Faulkner et al. | 156/213 X |
| 2,300,062 | 10/1942 | Radford | 273/61 R |
| 2,819,753 | 1/1958 | Nogue | 273/61 |
| 3,762,987 | 10/1973 | Maruta et al. | 156/247 X |
| 4,020,204 | 4/1977 | Taylor et al. | 428/40 |

FOREIGN PATENT DOCUMENTS 1502028 10/1966 France ............... 273/61 R

*Primary Examiner*—Edward Kimlin
*Assistant Examiner*—Ramon R. Hoch
*Attorney, Agent, or Firm*—Stevens, Davis, Miller & Mosher

[57] ABSTRACT

A tennis-ball is made by covering a spherical core with twelve substantially identical pentagonally-shaped pieces of a cover material. Before the pentagonally-shaped pieces are attached to the core, they are covered on their outermost surface by a removable layer of adhesive-impermeable barrier material (e.g. tissue paper). The barrier material restrains the movement of the pentagonally-shaped pieces when applied to the spherical core, so that a narrow uniform seam is obtained. When all twelve cover pieces are correctly positioned on the core, the barrier material is removed and the assembly subjected to a random rolling action to "finish" the ball.

13 Claims, No Drawings

TENNIS-BALLS

This invention relates to a method of covering tennis-ball cores and to tennis-balls obtained thereby.

A conventional tennis-ball comprises a spherical core made of rubber or other elastomeric material and a cover of cloth having a fibrous surface or 'nap'.

The cover of a conventional tennis-ball consists of two identically shaped pieces of cloth, each piece having the shape of a dumbbell.

The dumbbell-shaped pieces are coated on one face with an adhesive and are then applied to the spherical surface of the core before being urged into conformity therewith. It will be appreciated that, to make a "flat" cloth conform to a "curved" surface, curvature has to be induced in more than one dimension. Thus, the cloth pieces must be distorted in order to make them conform to the curvature of the core surface. As a dumbbell is "long" relative to its width, the distortion along and across the cloth piece will be different and some stretching of the cloth may be induced by the covering operation itself. Consequently, accurate positioning and adjustment is essential in order to produce a good fit of the cloth pieces.

The dumbbell-shaped cloth pieces can be applied by hand or by machinery. In hand application a skilled operator can readily adjust the dumbbells to conform to the curvature of the core, making due allowance for any slight variations therein. The process is labour-intensive.

If the dumbbells are to be applied by machinery, extremely accurate initial positioning is required and a disadvantage is that variations in the size of the spherical core are difficult to accommodate.

We have found that the two problems, of accurate positioning of the cloth and of making a "flat" material conform readily to a "curved" surface without stretching, can be facilitated by notionally dividing the spherical surface of the core into a plurality of identical pentagonal areas and fitting pentagonal shaped pieces of cloth to those areas. Thus, according to the present invention the spherical surface of the core is notionally divided into twelve pentagonal areas and the core is then covered by means of twelve substantially identical pentagonally-shaped pieces of cloth adhered thereto, which fit together to cover the ball surface.

Each piece of cloth is coated on its reverse side and on each of its edges with a suitable adhesive before being placed into position on the core and the assembly is then subjected to light consolidation so as to cause the adhesive-coated pieces to conform to the curvature of the core, whereby adjacent adhesive-coated edges are urged into abutment. The aforesaid "light consolidation" depends, for its operation, upon the inherent property of the cloth to stretch in all directions and thus effectively to "grow" in surface area.

We have also found that if this "growth" in surface area can be restrained until after completion of the "light consolidation" stage, an accurately-formed, narrow uniform seam can be achieved between each adjacent edge of the pentagonally-shaped pieces of cloth.

We have additionally found that, if the "growth" in surface area can be temporarily restrained, it is no longer necessary to coat any of the edges of the pentagonally-shaped pieces with adhesive prior to positioning those pieces on the core. This leads to a less labour-intensive method of covering the core.

Finally, we have found that the dimensions of the seams can be accurately controlled, to the extent that, if required, an effectively "seamless" ball can be produced.

The "growth" in surface area of the pentagonally-shaped cloth pieces is restrained, according to the present invention, by removably bonding to the wearing surface of the pieces a layer of a suitable barrier material, prior to applying the pieces to the core. The barrier material is required to restrict the stretching of the surface of the cloth to which it is applied and to be released after assembly of the ball is complete, and immediately before the final stage of the process.

Accordingly, the present invention provides a method of making a tennis-ball wherein a spherical core is covered with twelve substantially-identical pentagonally-shaped pieces of a cover material, said method comprising the following stages:

(a) Applying a layer of adhesive to the core;
(b) Removably bonding to the wearing surface of each piece of the cover material a layer of an adhesive-impermeable barrier material;
(c) Applying a layer of adhesive to the reverse surface of each piece of the cover material;
(d) Applying twelve of said pentagonally-shaped pieces to the core so that each piece is attached to the core by its centre and that the centre of each piece is equidistant from the centre of each adjacent piece and that the edges of each adjacent piece are aligned but not in contact with one another or with the core;
(e) Subjecting the assembly to light radial pressure over its whole surface area, whereby each pentagonally-shaped piece is made to conform to the curvature of the core and the edges of each adjacent piece are urged towards one another without coming into mutual abutment, so that a seam channel is defined by adjacent edges;
(f) Applying adhesive to the whole assembly so that the seam channel becomes filled with said adhesive;
(g) Treating the assembly so as to release the barrier material from the wearing surface of the cover material;
(h) Subjecting the assembly, by means known per se, to a random rolling action between parallel plates under sufficient load to distort the shape of the core, whereby circumferential pressure is applied to the cover material and adjacent edges of each pentagonally-shaped piece are urged into abutment and adhere to the core.

The present invention also provides a tennis-ball made by the method described in the immediately preceding paragraph.

The adhesive referred to hereinabove (stages (a) (c) and (f) of the process according to the present invention) can be any adhesive or combination of adhesives employed in the production of conventional tennis-balls. The adhesive may be heat-curable, in which case stage (h) (above) includes a heating process. Alternatively, the adhesive may be self-curing, in which case the covered core can be "finished" by keeping at ambient temperature for 24 hours.

The cover material may be a fabric, such as melton or a needle-punched fabric. Alternatively, the cover material may be a foamed plastics material such as polyethylene or polyurethane foam.

The adhesive-impermeable barrier material can be of any material which will undergo a sufficient degree of compliance to the curvature of the spherical core, whilst at the same time restraining movement of the wearing surface of the cover material. One particularly suitable example of such a barrier material is tissue paper. Alternatively, a water-absorbent or water-soluble foil material can be used.

In a further embodiment, the barrier material is one of the type comprising, in combination, a barrier layer and a pressure-sensitive adhesive, the adhesive having some compatibility with the adhesive used to apply the pentagonal pieces of cover material to the core. Thus, loosening of the barrier material commences immediately after the application of seam adhesive to the assembly (stage (f)) and "treatment" stage (stage (g)) can subsequently be effected by subjecting the assembly to a jet of steam or hot air, accompanied if necessary by mechanical agitation.

Examples of barrier materials according to the aforesaid preferred embodiment include masking tapes, cellulose adhesive tapes and insulating tapes.

When tissue paper is used as the barrier material, this is removably bonded to the wearing surface of the cover material by means of a bonding agent which is incompatible with the aforementioned adhesive. If the said adhesive is organic solvent-based (as is customary) then the bonding agent will be a reversible, water-soluble adhesive, e.g. one based on polyvinyl alcohol, polyvinyl acetate or starch. Alternatively, a labelling-adhesive or other water-soluble gum may be used.

Stage (f) (above) may conveniently be carried out by rotating the assembly and brushing to force the adhesive into the seam channel.

Where tissue paper is used as the barrier material, treatment of the assembly to release the barrier material may suitably comprise soaking the whole assembly in water, optionally with mechanical agitation to assist in "lift-off" of the barrier material. This will be followed by drying the assembly to remove excess water (e.g. by means of a centrifuge).

Where an adhesive-backed tape is used as the barrier material, treatment of the assembly to release the barrier material may comprise subjecting the assembly to a jet of steam or hot air, optionally with mechanical agitation to assist in "lift-off" of the barrier material. In this instance it will not be necessary to dry the assembly after treatment.

The process of the present invention lends itself to complete automation of each of the stages (a) to (h) (above). This has the advantages of reducing solvent-related environmental contamination, as well as reducing labour-costs.

Tennis-balls produced according to the present invention are much more spherically symmetrical than the conventional tennis-balls (covered with two dumbbell-shaped cloth pieces).

Tennis-balls produced according to the present invention meet the requirements of the International Tennis Federation.

Having now described our invention, what we claim is:

1. A method of making a tennis-ball wherein a spherical core is covered with twelve substantially identical pentagonally-shaped pieces of a cover material, said method comprising the following stages:
    (a) Applying a layer of adhesive to the core;
    (b) Restricting the stretching of the cover material by removably bonding to the wearing surface of each piece of the cover material a layer of an adhesive-impermeable barrier material
    (c) Applying a layer of adhesive to the reverse surface of each piece of the cover material
    (d) Applying twelve of said pentagonally-shaped barrier covered pieces to the core to form an assembly so that each piece is attached to the core by its centre and that the centre of each piece is equidistant from the centre of each adjacent piece and that the edges of each adjacent piece are aligned but not in contact with one another or with the core;
    (e) Subjecting the assembly to light radial pressure over its whole surface area, whereby each pentagonally-shaped piece is made to conform to the curvature of the core and the edges of each adjacent piece are urged towards one another without coming into mutual abutment, so that a seam channel is defined by adjacent edges;
    (f) Applying adhesive to the whole assembly including at least part of the barrier material so that the seam channel becomes filled with said adhesive;
    (g) Treating the assembly so as to release the barrier material from the wearing surface of the cover material;
    (h) Subjecting the assembly, to a random rolling action between parallel plates under sufficient load to distort the shape of the core, whereby circumferential pressure is applied to the cover material and adjacent edges of each pentagonally-shaped piece are urged into abutment and adhere to the core.

2. The method of claim 1, wherein said cover material is a melton fabric.

3. The method of claim 1, wherein said cover material is a needle-punched fabric.

4. The method of claim 1, wherein said cover material is a foamed plastics material.

5. The method of claim 1, wherein said adhesive on the core is a heat-curable adhesive.

6. The method of claim 1, wherein said adhesive on the core is a self-curing adhesive.

7. The method of claim 1, wherein said barrier material is tissue paper.

8. The method of claim 1, wherein said barrier material is one selected from the group consisting of water-absorbent foil materials and water-soluble foil materials.

9. The method of claim 1, wherein said stage (g), whereby said barrier material is released from the wearing surface of said cover material, consists essentially of soaking the assembly in water.

10. The method of claim 1, wherein said barrier material comprises, in combination, a barrier layer and a pressure-sensitive adhesive.

11. The method of claim 10, wherein said barrier material is one selected from the group consisting of masking tapes, cellulose adhesive tapes and insulation tapes.

12. The method of claim 1, wherein said stage (g), whereby said barrier material is released from the wearing surface of said cover material, consists essentially of subjecting the assembly to a jet of steam or of hot air.

13. The method of claim 1 including the step of rotating the assembly following step (f) and brushing to force the adhesive into the seam channel.

* * * * *